(12) United States Patent
Hawthorne

(10) Patent No.: US 6,772,342 B1
(45) Date of Patent: Aug. 3, 2004

(54) DOCUMENT OR MESSAGE SECURITY ARRANGEMENTS USING A NUMERICAL HASH FUNCTION

(76) Inventor: William McMullan Hawthorne, 9a Mount Boone, Dartmouth, Devon (GB), TQ6 9PB ( * ) Notice: Subject to any disclaimer, the term of this patent is extended or adjusted under 35 U.S.C. 154(b) by 0 days.

(21) Appl. No.: 09/463,345
(22) PCT Filed: Jul. 22, 1998
(86) PCT No.: PCT/GB98/02187
§ 371 (c)(1),
(2), (4) Date: Apr. 3, 2000
(87) PCT Pub. No.: WO99/05819
PCT Pub. Date: Feb. 4, 1999

(30) Foreign Application Priority Data

Jul. 23, 1997 (GB) .............................................. 9715411

(51) Int. Cl.⁷ .............................. H04L 9/00; G06F 7/38
(52) U.S. Cl. .......................... 713/176; 713/176; 380/28; 380/55; 708/491
(58) Field of Search ............................. 380/28, 25, 55; 713/176; 708/491

(56) References Cited

U.S. PATENT DOCUMENTS

| | | | |
|---|---|---|---|
| 4,807,182 A | 2/1989 | Queen ......................... | 364/900 |
| 5,465,299 A | 11/1995 | Matsumoto et al. .......... | 380/23 |
| 5,530,757 A | 6/1996 | Kraeczyk ..................... | 380/23 |
| 5,638,446 A | 6/1997 | Rubin ......................... | 380/25 |
| 5,912,974 A * | 6/1999 | Holloway et al. ............ | 380/51 |
| 5,915,024 A * | 6/1999 | Kitaori et al. ............... | 713/176 |

FOREIGN PATENT DOCUMENTS

| | | | |
|---|---|---|---|
| EP | 0117281 A2 | 10/1983 | |
| EP | 0386867 A2 | 1/1990 | |
| EP | 0782108 A2 | 2/1997 | |
| GB | 2315965 A | 7/1997 | |
| JP | 62-165236 | 7/1987 | ............. G06F/7/28 |
| WO | WO92/03000 | 2/1992 | |

OTHER PUBLICATIONS

Applied Cryptography, second edition, by Bruce Schneier, pp. 455–456.*
Applied Cryptography, second edition, by B. Schneier, pp. 455–457, 1996, J. Wiley, NY.
Bellare et al, "Keying Hash Functions for Message Authentication", 1996.
Internet Cryptography, R.E. Smith, 1997, Addison Wesley, pp 122–126.

* cited by examiner

*Primary Examiner*—Gilberto Barron
*Assistant Examiner*—Abdulhakim Nobahar
(74) *Attorney, Agent, or Firm*—Gordon & Jacobson, PC

(57) ABSTRACT

A document or message is protected against forgery or repudiation by processing a selected part or parts of the text of the document or message to form a hash, usually of fewer characters than the selected part or parts of the text. The processing comprises retrieving numerical values which define the respective characters of the selected part or parts of the text and making a calculation using the numerical values of the successive characters. Preferably the hash is added to the text.

18 Claims, 3 Drawing Sheets

---

I shall assume that the following is agreeable unless

I hear otherwise:

~ ~ ~ ~ ~ ▊

1•••Royalties•shall•be•paid•at•2•1/2%.▊

~ ~ ~ ~ ~

Yours sincerely,

I shall assume that the following is agreeable unless

I hear otherwise:

~ ~ ~ ~ ~ ▌

1•••Royalties•shall•be•paid•at•2•1/2%.▌

~ ~ ~ ~

Yours sincerely, 2  4  8  16  32  64  128  256  512  1024

Figure 3

| A | y | b | q | p | p | n | p | z | m | p |
|---|---|---|---|---|---|---|---|---|---|---|
| ■ | 1 | 13 | 0 | 4 | 17 | 1 | 238 | 50 | 25583 | 238 |
| 1 | 2 | 49 | 238 | 8 | 295 | 2 | 15045 | 40 | 26927 | 15045 |
| • | 3 | 32 | 15045 | 16 | 15093 | 3 | 528255 | 37 | 27299 | 9574 |
| • | 4 | 32 | 9574 | 32 | 9638 | 4 | 346968 | 17 | 29759 | 19619 |
| • | 5 | 32 | 19619 | 64 | 19715 | 5 | 729455 | 41 | 26903 | 3074 |
| R | 6 | 82 | 3074 | 128 | 3284 | 6 | 288992 | 37 | 27299 | 16002 |
| o | 7 | 111 | 16002 | 256 | 16369 | 7 | 1931542 | 51 | 25343 | 5474 |
| Y | 8 | 121 | 5474 | 512 | 6107 | 8 | 787803 | 50 | 25583 | 20313 |
| a | 9 | 97 | 20313 | 1024 | 21434 | 9 | 2272004 | 60 | 23879 | 3499 |
| l | 0 | 108 | 3499 | 2 | 3609 | 10 | 425862 | 58 | 24083 | 16451 |
| t | 1 | 116 | 16451 | 238 | 16805 | 11 | 2134235 | 39 | 27107 | 19889 |
| i | 2 | 105 | 19889 | 15045 | 35039 | 12 | 4099563 | 51 | 25343 | 19340 |
| e | 3 | 101 | 19340 | 9574 | 29015 | 13 | 3307710 | 9 | 31139 | 6976 |
| s | 4 | 115 | 6976 | 19619 | 26710 | 14 | 3445590 | 48 | 25799 | 14323 |
| • | 5 | 32 | 14323 | 3074 | 17429 | 15 | 819163 | 11 | 30539 | 25149 |
| s | 6 | 115 | 25149 | 16002 | 41266 | 16 | 5405846 | 37 | 27299 | 644 |
| h | 7 | 104 | 644 | 5474 | 6222 | 17 | 752862 | 40 | 26927 | 25833 |
| a | 8 | 97 | 25833 | 20313 | 46243 | 18 | 5317945 | 5 | 31607 | 7969 |
| l | 9 | 108 | 7969 | 3499 | 11576 | 19 | 1470152 | 61 | 23819 | 17193 |
| l | 0 | 108 | 17193 | 16451 | 33752 | 20 | 4320256 | 26 | 28643 | 23806 |
| • | 1 | 32 | 23806 | 19889 | 43727 | 21 | 2317531 | 26 | 28643 | 26091 |
| b | 2 | 98 | 26091 | 19340 | 45529 | 22 | 5463480 | 48 | 25799 | 19891 |
| e | 3 | 101 | 19891 | 6976 | 26968 | 23 | 3344032 | 12 | 30467 | 23129 |
| • | 4 | 32 | 23129 | 14323 | 37484 | 24 | 2099104 | 42 | 26627 | 22198 |
| p | 5 | 112 | 22198 | 25149 | 47459 | 25 | 6501883 | 22 | 29339 | 17964 |
| a | 6 | 97 | 17964 | 644 | 18705 | 26 | 2300715 | 14 | 30323 | 26490 |
| i | 7 | 105 | 26490 | 25833 | 52428 | 27 | 6920496 | 1 | 32507 | 29012 |
| d | 8 | 100 | 29012 | 7969 | 37081 | 28 | 4746368 | 23 | 29243 | 9002 |
| • | 9 | 32 | 9002 | 17193 | 26227 | 29 | 1599847 | 46 | 25919 | 18788 |
| a | 0 | 97 | 18788 | 23806 | 42691 | 30 | 5421757 | 62 | 23663 | 2930 |
| t | 1 | 116 | 2930 | 26091 | 29137 | 31 | 4283139 | 32 | 28019 | 24251 |
| • | 2 | 32 | 24251 | 19891 | 44174 | 32 | 2827136 | 16 | 29879 | 18510 |
| 2 | 3 | 50 | 18510 | 23129 | 41689 | 33 | 3460187 | 4 | 31847 | 20711 |
| • | 4 | 32 | 20711 | 22198 | 42941 | 34 | 2834106 | 26 | 28643 | 27092 |
| 1 | 5 | 49 | 27092 | 17964 | 45105 | 35 | 3788820 | 23 | 29243 | 16473 |
| / | 6 | 47 | 16473 | 26490 | 43010 | 36 | 3569830 | 25 | 28979 | 5413 |
| 2 | 7 | 50 | 5413 | 29012 | 34475 | 37 | 2999325 | 37 | 27299 | 23734 |
| % | 8 | 37 | 23734 | 9002 | 32773 | 38 | 2457975 | 60 | 23879 | 22317 |
| • | 9 | 46 | 22317 | 18788 | 41151 | 39 | 3497835 | 63 | 23627 | 1039 |
| ■ | 0 | 13 | 1039 | 2930 | 3982 | 40 | 211046 | 61 | 23819 | 20494 |

Figure 4

| | | | | | | | | | | |
|---|---|---|---|---|---|---|---|---|---|---|
| ■ | | 1 | 13 | 20494 | 24251 | 44758 | 41 | 2416932 | 7 | 31547 | 19360 |
| | 1 | 2 | 49 | 19360 | 18510 | 37919 | 42 | 3450629 | 58 | 24083 | 6760 |
| | • | 3 | 32 | 6760 | 20711 | 27503 | 43 | 2062725 | 38 | 27239 | 19800 |
| | • | 4 | 32 | 19800 | 27092 | 46924 | 44 | 3566224 | 27 | 28607 | 18956 |
| | • | 5 | 32 | 18956 | 16473 | 35461 | 45 | 2730497 | 48 | 25799 | 21602 |
| | R | 6 | 82 | 21602 | 5413 | 27097 | 46 | 3468416 | 29 | 28319 | 13498 |
| | o | 7 | 111 | 13498 | 23734 | 37343 | 47 | 5900194 | 31 | 28163 | 14127 |
| | y | 8 | 121 | 14127 | 22317 | 36565 | 48 | 6179485 | 57 | 24203 | 7720 |
| | a | 9 | 97 | 7720 | 1039 | 8856 | 49 | 1292976 | 41 | 26903 | 1632 |
| | l | 0 | 108 | 1632 | 20494 | 22234 | 50 | 3512972 | 37 | 27299 | 18700 |
| | t | 1 | 116 | 18700 | 19360 | 38176 | 51 | 6375392 | 30 | 28307 | 6317 |
| | i | 2 | 105 | 6317 | 6760 | 13182 | 52 | 2069574 | 47 | 25847 | 1814 |
| | e | 3 | 101 | 1814 | 19800 | 21715 | 53 | 3344110 | 47 | 25847 | 9847 |
| | s | 4 | 115 | 9847 | 18956 | 28918 | 54 | 4887142 | 45 | 26003 | 24581 |
| | • | 5 | 32 | 24581 | 21602 | 46215 | 55 | 4020705 | 61 | 23819 | 19113 |
| | s | 6 | 115 | 19113 | 13498 | 32726 | 56 | 5596146 | 1 | 32507 | 4942 |
| | h | 7 | 104 | 4942 | 14127 | 19173 | 57 | 3086853 | 46 | 25919 | 2492 |
| | a | 8 | 97 | 2492 | 7720 | 10309 | 58 | 1597895 | 2 | 32183 | 20928 |
| | l | 9 | 108 | 20928 | 1632 | 22668 | 59 | 3785556 | 62 | 23663 | 23139 |
| | l | 0 | 108 | 23139 | 18700 | 41947 | 60 | 7047096 | 60 | 23879 | 2791 |
| | • | 1 | 32 | 2791 | 6317 | 9140 | 61 | 850020 | 5 | 31607 | 28238 |
| | b | 2 | 98 | 28238 | 1814 | 30150 | 62 | 4824000 | 33 | 27827 | 9929 |
| | e | 3 | 101 | 9929 | 9847 | 19877 | 63 | 3259828 | 58 | 24083 | 8623 |
| | • | 4 | 32 | 8623 | 24581 | 33236 | 64 | 3190656 | 60 | 23879 | 14749 |
| | p | 5 | 112 | 14749 | 19113 | 33974 | 65 | 6013398 | 19 | 29567 | 11297 |
| | a | 6 | 97 | 11297 | 4942 | 16336 | 66 | 2662768 | 13 | 30347 | 22579 |
| | i | 7 | 105 | 22579 | 2492 | 25176 | 67 | 4330272 | 16 | 29879 | 27696 |
| | d | 8 | 100 | 27696 | 20928 | 48724 | 68 | 8185632 | 63 | 23627 | 10690 |
| | • | 9 | 32 | 10690 | 23139 | 33861 | 69 | 3419961 | 14 | 30323 | 23785 |
| | a | 0 | 97 | 23785 | 2791 | 26673 | 70 | 4454391 | 61 | 23819 | 238 |
| | t | 1 | 116 | 238 | 28238 | 28592 | 71 | 5346704 | 8 | 31259 | 1415 |
| | • | 2 | 32 | 1415 | 9929 | 11376 | 72 | 1183104 | 52 | 25307 | 18982 |
| | 2 | 3 | 50 | 18982 | 8623 | 27655 | 73 | 3401565 | 56 | 24239 | 8105 |
| | • | 4 | 32 | 8105 | 14749 | 22886 | 74 | 2425916 | 24 | 29123 | 8707 |
| | 1 | 5 | 49 | 8707 | 11297 | 20053 | 75 | 2486572 | 40 | 26927 | 9288 |
| | / | 6 | 47 | 9288 | 22579 | 31914 | 76 | 3925422 | 62 | 23663 | 21027 |
| | 2 | 7 | 50 | 21027 | 27696 | 48773 | 77 | 6194171 | 59 | 24023 | 20260 |
| | % | 8 | 37 | 20260 | 10690 | 30987 | 78 | 3563505 | 26 | 28643 | 11773 |
| | • | 9 | 46 | 11773 | 23785 | 35604 | 79 | 4450500 | 51 | 25343 | 15475 |
| | ■ | 0 | 13 | 15475 | 238 | 15726 | 80 | 1462518 | 21 | 29399 | 21967 |

Figure 5

OLH: 2 - 20 -67158205078827607375

Figure 6

DOCUMENT OR MESSAGE SECURITY ARRANGEMENTS USING A NUMERICAL HASH FUNCTION

BACKGROUND OF THE INVENTION

1. Field of the Invention

The present invention relates to arrangements for the protection of documents against forgery or repudiation. The invention also relates to arrangements for the protection of electronically transmitted messages against forgery or repudiation.

2. State of the Art

It is common nowadays to provide security to documents through the use of holograms, watermarks, personal signature, notary stamps and other physical means: these all increase the difficulty for making unauthorised imitations or changes; however, they all require physical inspection, often involving forensic equipment and expertise, in order to detect a counterfeit. It is also becoming increasingly necessary to provide security for electronically transmitted messages.

SUMMARY OF THE INVENTION

The present invention provides for the security of the text of a document or message by cryptographic techniques.

In accordance with the present invention, there is provided an apparatus which is arranged to process a selected part or selected parts of the text of a document or message to form a hash, the hash usually being of fewer characters than the selected part or parts of the text, the processing comprising retrieving numerical values which define the respective characters of the selected part or parts of the text and making a calculation using the numerical values of the successive characters.

The apparatus may be arranged to receive or create a text in electronic form, then process this text to derive the hash of the selected part or parts of the text. The apparatus may further be arranged to add the hash to the text: typically, the apparatus then outputs the text, with the added hash, either for printing as a document or for electronic transmission. Alternatively the apparatus may be arranged to output the text and the hash separately (or store one and output the other).

The practical value of the hash is that it is sensitive to any change or alteration in the selected part of the text from which it is derived: it is not feasible to make a desired alteration to that part of the text whilst preserving the same hash value.

The hash thus forms a cryptographic signature which makes forgery detectable on the basis of an assessment of the content of the text and without the need for any forensic examination of the document.

The hash algorithm is not applied to the whole text, only to a selected part, or to selected parts. The or each part is identified, or sealed, by predetermined characters or combinations or characters immediately preceding and immediately following it: for example, a series of tilde marks (~) may be used.

Preferably the numerical values of the respective characters of the selected text are their ASCII values: the characters preferably include all keystrokes (including space, return etc.); preferably the "alphabet" is restricted to all keystrokes having ASCII values in the range 32 to 125 inclusive and also including ASCII values for the "return".

Preferably the processing is recursive, in that the calculation in respect of each character uses the result of the calculation made in respect of at least one previous character.

Preferably the calculations for the first several (e.g. 10) characters use successive ones of a set of initial variables: preferably the calculations for each subsequent character uses, instead of an initial variable, the result of the calculation in respect of a previous character.

Preferably each calculation also uses one of a predetermined set of prime numbers. Preferably each calculation uses an interim result to determine which of these prime numbers is used to complete the calculation.

Preferably the processing involves at least a second pass over the selected part or parts of the text: in other words, once the calculation for the last character is completed, a second series of successive calculations is carried out on the characters, typically starting with the first character, and using the results of the calculations of the first series.

At the end of the above-described processing, the hash is formed by taking selected digits from the results obtained in a final plurality of the calculations: for example the final two digits may be taken from each of the final 10 results, and a 20-digit hash formed by placing these 10 pairs of digits in a given order.

One form of hash algorithm used in the invention is an Objective Linguistic Hash (OLH). This is linguistic in that it "reads" letters, numbers and other keys commonly used in the preparation of documents. It is objective in that the hash value produced can be verified by anyone using the algorithm. The OLH algorithm produces a final number by acting recursively one character at a time throughout the length of the message.

The variability of the message far exceeds the variability of the final hash, so inevitably many different messages would have the same hash value. However, it is unfeasible to make a meaningful change to the message whilst retaining the same hash number.

It will be appreciated that the invention may be incorporated in a word processing apparatus. In this use, a document is created in electronic form on the apparatus, complete with the seal (e.g. series of tilde marks) at the beginning and end of the or each selected part of the text. A "sealing" command is then performed, whereupon the apparatus automatically processes the "sealed" part or parts of the text to create the hash, which is stored with the text. Subsequently, the document can be altered or corrected as necessary, then "re-sealed", to process the sealed part or parts of the text again and create the hash afresh. Once the document is finalised, it can be printed out, complete with the hash.

The above-mentioned OLH algorithm may be modified to provide a Subjective Linguistic Hash (SLH). This differs from the OLH in that it is made subjective by being "seeded" with secret information known only to an accredited authority: thus, the processing of the selected or "sealed" part or parts of the text is carried out using secret initial variables. Preferably use is made of a seed, in the form of a very large secret number (typically having 50 to 200 digits) known as the Secret Primitive (SP). An algorithm is run, using the SP, to produce the initial variables: preferably this algorithm also uses a number of items of open information, known as Open Primitives (OP's), contained in the document or message being protected. The SLH algorithm may produce a plain hash initially, then encrypt this using the SP as secret key: this preserves the secrecy of the plain hash.

A further algorithm which can be used in accordance with the invention is a Subjective Encrypted Hash (SEH) algorithm. This involves encrypting an OLH hash, using secret primitive values known only to a witnessing party, together with open primitive values such as date and time. In this case, the witnessing party uses an apparatus into which the OLH of a document or message is keyed, together with the open primitive values, and which encrypts the OLH using the SEH algorithm, to create the SEH hash which is preferably printed on the document, or on a label for application to the document. Preferably the apparatus stores the initial OLH and the final SEH, together with the open primitive values.

Embodiments of the present invention will now be described by way of examples only and with reference to the accompanying drawings, in which:

FIG. 1 is a schematic diagram of an apparatus in accordance with the invention;

FIG. 2 sets out an example of a document text to be processed;

FIG. 3 gives an example of a set of initial variables to be used in the processing algorithm;

FIG. 4 is a table detailing the successive steps in applying the processing algorithm to the document text of FIG. 1;

FIG. 5 is a table detailing the successive steps in applying the processing algorithm in a second pass to the document text; and FIG. 6 sets out the final 20-digit hash which is created.

Figures 1, 2:
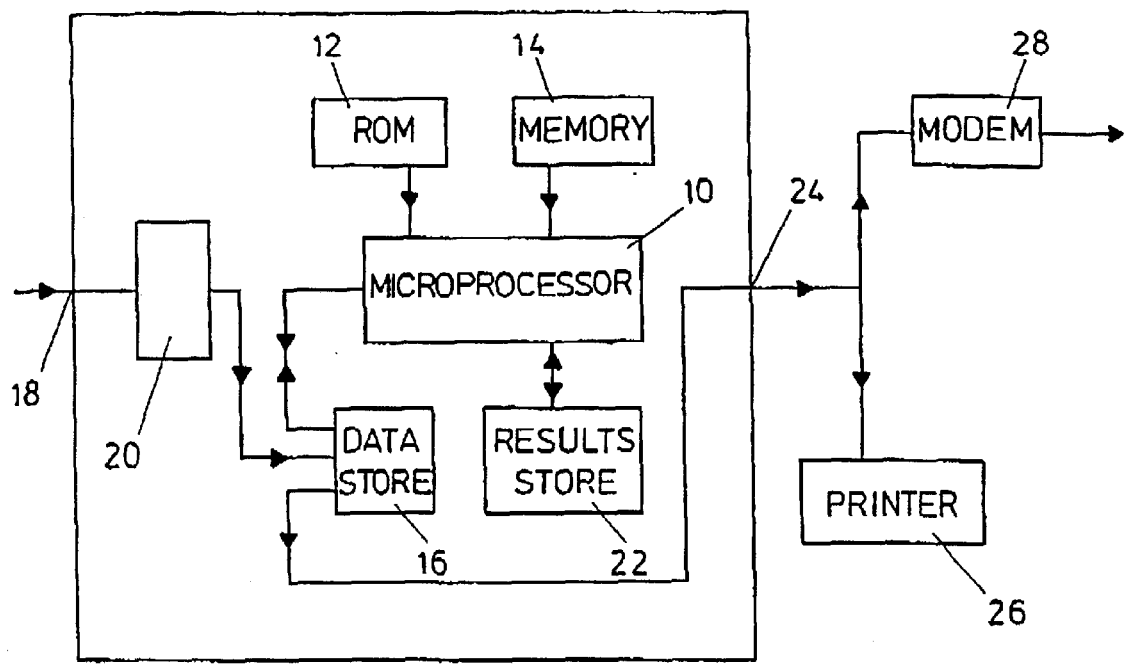

Referring to FIG. 1, an apparatus in accordance with the present invention comprises a microprocessor 10 having connected to it a read-only memory (ROM) 12, a memory 14 for predetermined values, and a data store 16. The ROM 12 holds a hash algorithm and a memory 14 holds a set of initial variables and additionally a set of 64 prime numbers each of 5 digits) and also three prime numbers (preferably the prime numbers 37, 17, and 7). The apparatus has an input port 18 coupled via a buffer 20 to the data store 16. The message or text to be processed may be received in electronic form on the input 18, or it may be already stored in the data store 16. The microprocessor processes the messages or text in accordance with the algorithm held in the ROM 12 and using the predetermined values held in the memory 14, in the manner which will be described below: the partial results of the hash calculation are written to and read from a results store 22. Finally, the calculated hash is added to the electronic text in the data store 16. The apparatus has a data output port 24, through which the message text complete with its hash can be sent from the data store 16, whether to a printer 26 or a transmission modem 28 or other computer peripheral device.

FIGS. 2 to 6 provide a worked example which uses an OLH algorithm on a selected part of the text (FIG. 2) of a document, typically a word processed document, namely the part between the two series of five tilde marks (~ ~ ~ ~ ~). The hash algorithm uses a set of initial values or variables (IV's), in this example 2, 4, 8, 16, 32, 64, 128, 256, 512 and 1024 (FIG. 3): the algorithm additionally uses a set of 64 prime numbers (each of 5 digits) used as modulators and also three prime numbers, preferably 37, 17 and 7, as will be shown below; the OLH algorithm is stored in the ROM 12 of FIG. 1 and the initial variables and the prime numbers just referred to are stored in memory 14. The tables of FIGS. 4 and 5 show the processing carried out to create a 20-digit hash. The following description, referring firstly to FIG. 4, shows the manner in which the calculations proceed, taking for example the 16th row. It will be noted that the part of the message of FIG. 2 to be processed is set out character-by-character in the first column of the table of FIG. 4: the rows are numbered 0 to 9 cyclically (starting with 1) in the second column; the initial variables of FIG. 3 are used in turn in the 5th column, for the first 10 rows.

Thus, reading across the 16th row in the table of FIG. 4, we have:

s=the input character

6=the "y" value, i.e. the choice of recursive P(y)

115=the ASCII value of "S"

25149=the value of the result on the preceding row, namely P(5)=25149

16002=the last value of P(y), i.e. P(6) (found in the last column ten rows earlier).

41266=115+25149+16002 (the sum of the values in the three preceding columns in the same row)

16=the value of n, where n is the ordinal of the character in the text

5405846=41266×(115+16) (i.e., the sum of the ASCII value of "s" plus the value of "n" times the sum obtained two columns to the left in the same row).

37=the value of Z =(37×115+17×16+7×25149+30539) mod 64 (where the prime numbers 37, 17, and 7 are multiplied respectively with the ASCII value of "s", the value of "n", the value of the result of the preceding row P(5), and the "30539" is the value "m" of the preceding row)

27299="m " the value of the 37th 240 th of the set of 64 5-digit prime numbers

644=5405846 (the value abtgained in the same row three columns earlier) mod 27299 (i,e mod "m")

It will be noted that the calculation on each row in the table of FIG. 4 is recursive, in that it uses results produced on previous rows (see the 4th and 5th items in each row). Further, in the example shown, the algorithm makes a second pass over the sealed part of the text: the successive calculations of this are set out in the table of FIG. 5. Finally, the 20-digit OLH hash is produced by selecting the final two digits of the results (final column) of the final 10 rows, placed in the order of recursive p(y)=0 to 9: this hash is set out in FIG. 6.

Any attempt to alter the sealed part of the text, whilst retaining the same hash value, would require subsequent alterations in all further recursive steps to the end of that text. This is inherently difficult, but made more so by continuing the recursion back to the beginning of the sealed text for the second pass: a third pass may additionally be made.

The above-described OLH algorithm may be modified to form a Subjective Linguistic Flash (SLH). The SLH differs from the OLH in that it is made subjective by being "seeded" with secret information known only to an accredited authority: the initial values (IV's) are therefore secret. Preferably the seed is a very large secret number, typically with 50 to 200 digits, and known as the Secret Primitive (SP), known only to the issuing authority. The SLH algorithm "fuses" the SP with open information, known as Open Primitives (OP's), contained in the document or message, to produce the initial variables (IV's). Preferably the algorithm produces a "plain hash" in the first instance, which is then doubly encrypted using the SP as secret key. This preserves the secrecy of the plain hash and makes it mathematically unfeasible to work backwards through the document to discover the primitives.

A further algorithm which can be used is a Subjective Encrypted Hash (SEH). The SEH involves encrypting an OLH hash. The encryption incorporates secret primitive (SP) values known only to a witnessing party, and open primitive (OP) values such as date and time or other non-repeating factors. Further, the encryption is one-way, because the OLH is also fused with the OP and SP values. Since the key is therefore part of the message, the crypt cannot be reversed by application of the key. Every output value of a fixed OLH is therefore distinct, due to non-repeating elements in the OP's.

A number of possible applications of the invention will now be described by way of examples only.

A first application of the invention is for preventing fraudulent alteration of a Vehicle Registration Document. It is well known that stolen or redundant Vehicle Registration Documents have a value in the process of "ringing", that is, altering the identity of a stolen car. To complete the fraud, a plausible Vehicle Registration Document is required. In a first case, the ringer will have to make a forged alteration to the document, for example, to cover a re-spray in a different colour. In a second case, if the ringer can alter the identity of a car, exactly to match the Vehicle Registration Document, then the fraud is undetectable to an unsuspecting buyer.

The present invention can prevent fraud in either case in the following way. When a vehicle is insured, the important fixed elements of the particular information concerning the vehicle and its keeper form the message parts of the hash algorithm. The secret primitives are in the possession of the insurer of the vehicle.

Example of message parts are:
Owner, Keeper, Registration Number, Make, Model, Colour, Chassis Number, Engine number.

These parts are impossible to alter in a fraudulent way, without knowledge of the corresponding altered value of the SLH. Thus an SLH hash marked on the Registration Document protects against the first case of fraud. To solve the problem of the second case, OP's are added as follows:
Insurance Renewal Date, Mileage on last insurance, Stated value on last insurance.

These OP's have to be altered in the second case to give a vehicle a new false history. It is not possible for a ringer to do this because the true history is protected by earlier SLH's.

The SP for a given Insurance Company or other authority would preferably be a very large number, typically of 50 to 200 digits. It is preferably that the insurance company produces an updated SLH each year, using details of the vehicle and its keeper held or added to its stored record for that client, and including the vehicle mileage: the SLH may then be printed.

In a variation applicable to a vehicle registration document, the insurance company may produce an SLH each year, using details of the vehicle and its keeper, including the vehicle mileage: the SLH is then printed on a sticker, together with open information of the vehicle (e.g. mileage, value of the vehicle) for the keeper to stick on the vehicle registration document. Each time the insurance is renewed, an additional such sticker is created for the keeper to add to the registration document. It will be appreciated that the registration document will thus include, in respect of each renewal, a hash related to data printed in selected parts or fields of the document.

A second application of the invention is relevant to high value tickets, bought in advance where there is high risk of fraud. This form of fraud is rife for example in the sale of tickets for long-awaited pop concerts where the forged tickets are sold to young people in a social context where they are likely to be susceptible. Nothing can prevent a buyer from purchasing a ticket where there is no ready means of verifying its data, but with a suitable warning this application of the invention exerts psychological pressure due to the uncertainty that a ticket bought from an unofficial source will be valid on the day of the concert. A suitable warning might read as follows:

Warning: If you have bought this ticket from an unauthorised source, it may be a perfect forgery. Only genuine tickets will pass the electronic test at the turnstile. Do not run the risk of being turned away.

Each event is given an SP which is available as an input to the software used at legitimate outlets. This SP is only released to points of entry to the concert immediately before the crowds start to appear. The point of entry has a machine for reading the hash from the ticket: the hash may be printed on the ticket, at the time of issue, in both human-readable and machine-readable form. The OP is a combination of the date and time of sale, correct to the nearest second, and the name of the buyer. The SLH is also printed on the ticket. Even if the fraudster prints a very recent time and date, it is mathematically unfeasible to calculate the appropriate SLH, so he has a hazardous task of persuading the buyer that he/she must attach no significance to the lapse of time. Further, the buyer who reads the warning on the reverse side of the ticket is put under the psychological pressure of having to wait for the concert itself before knowing whether the ticket is valid.

A third application of the invention is relevant to National Identity Cards which display a photograph and personal details of the legitimate owner. The invention provides for a massive SP (containing at least 400 figures) held in a tamper proof location. The printed matter of the card is classified either as message parts to be hashed or OP's. The SLH is printed on the face of the card as additional information. This prevents alteration of a card or the printing of a false identity.

A fourth application of the invention is the use of a Trusted Third Party such as an accredited Notary Public to provide an SEH supplied with a pre-calculated OLH for a "sealed" part of a document. The document itself may either be sent in plain or in crypt. The function of the notary is to use the OLH to calculate the SEH. The document may be processed to provide it with a double header, the OLH and the SEH which incorporates a date/time stamp. In the event of a dispute both "versions" of the disputed text can be tested by an OLH, but only the valid OLH will have the proper SEH.

What is claimed is:

1. An apparatus which is arranged to process a selected part or selected parts of the text of a document or message to form a hash, the hash being of fewer characters than the selected part or parts of the text, the processing comprising retrieving numerical values which define the respective characters of the selected part or parts of the text and making a calculation using the numerical values of the successive characters of said selected part or parts of the text, the calculation made in respect of each said character using the result of the calculation made in respect of at least one previous character and also using one of a predetermined set of prime numbers, and each said calculation using an interim result to determine which of said set of prime numbers is used to continue that calculation.

2. An apparatus as claimed in claim 1, which is arranged to receive or create said text in electronic form, then process said text to derive said hash.

3. An apparatus as claimed in claim 2, arranged to add said hash to said text.

4. An apparatus as claimed in claim 3, arranged to output text, with the added hash.

5. An apparatus as claimed in claim 2, arranged to output said text and its hash separately, or to store one and output the other.

6. An apparatus as claimed in claim 1, arranged for the or each said part of said text to be identified by predetermined characters or combinations of characters immediately preceding and following it.

7. An apparatus as claimed in claim 6, in which each said identifier comprises a series of tilde marks.

8. An apparatus as claimed in claim 1, in which said numerical values of the respective characters of the selected text are their ASCII values.

9. An apparatus as claimed in claim 8, in which an alphabet which includes all said characters is restricted to all keystrokes having ASCII values in the range 32 to 125 inclusive.

10. An apparatus as claimed in claim 1, arranged so that the calculations made for a first plurality of characters use successive ones of a set of initial variables.

11. An apparatus as claimed in claim 1, arranged so that said processing involves at least a second pass over the selected part or parts of said text.

12. An apparatus as claimed in claim 1, arranged so that at the end of said processing, the hash is formed by taking selected digits from the results obtained in a final plurality of said calculation.

13. An apparatus as claimed in claim 1, arranged such that said hash is seeded with secret information.

14. An apparatus as claimed in claim 13, arranged such that said processing is carried out using secret initial variables.

15. An apparatus as claimed in claim 1, arranged to encrypt said hash.

16. An apparatus as claimed in claim 15, arranged to store said hash and the encrypted hash formed from it.

17. A process of forming a hash from a selected part or from selected parts of the text of a document or message, the process comprising retrieving numerical values which define the respective characters of the selected part or parts of said text and making a calculation using the numerical values of the successive characters of said selected part or parts of the text, the calculation in respect of each said character using the result of the calculation made in respect of at least one previous character and also using one of a predetermined set of prime numbers, wherein each said calculation uses an interim result to determine which of said set of prime numbers is used to continue the calculation, said hash being of fewer characters than said selected part or parts of the text.

18. A process as claimed in claim 17, in which the calculations made for a first plurality of said characters also use successive ones of a set of initial variables.

* * * * *